US007245926B2

(12) United States Patent
Liao et al.

(10) Patent No.: US 7,245,926 B2
(45) Date of Patent: Jul. 17, 2007

(54) MULTIMEDIA INFORMATION AND INFORMATION INQUIRY DOWNLOAD SERVICE

(75) Inventors: Sheng-Hsuan Liao, Taipei (TW); Ting-Hsun Kao, Taipei (TW); Meng-Ying Tsai, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 446 days.

(21) Appl. No.: 10/820,742

(22) Filed: Apr. 9, 2004

(65) Prior Publication Data

US 2004/0214557 A1   Oct. 28, 2004

(30) Foreign Application Priority Data

Apr. 11, 2003   (TW) .............................. 92108438 A

(51) Int. Cl.
*H04Q 7/20* (2006.01)
*H04M 11/00* (2006.01)
(52) U.S. Cl. .............................. 455/456.3; 455/414.3; 455/414.1; 455/406; 701/207; 701/208; 707/10; 707/104.1; 709/218; 709/219
(58) Field of Classification Search ................ 455/405, 455/406, 414.1, 414.2, 414.3, 426.1, 466, 455/456.3, 408; 701/200, 201, 207–211; 370/395.5; 707/104.1, 1, 3, 10, 14.11; 709/217–219, 709/230
See application file for complete search history.

(56) References Cited

U.S. PATENT DOCUMENTS

| | | | |
|---|---|---|---|
| 6,556,217 B1* | 4/2003 | Makipaa et al. ............ 345/667 |
| 6,640,097 B2* | 10/2003 | Corrigan et al. ......... 455/414.1 |
| 6,944,447 B2* | 9/2005 | Portman et al. .......... 455/422.1 |
| 6,968,175 B2* | 11/2005 | Raivisto et al. ............. 455/406 |
| 2001/0041566 A1* | 11/2001 | Xanthos et al. ............. 455/423 |
| 2002/0019812 A1* | 2/2002 | Board et al. ................... 705/51 |
| 2002/0035617 A1* | 3/2002 | Lynch et al. ................ 709/219 |
| 2002/0077084 A1* | 6/2002 | Zellner et al. .............. 455/414 |
| 2002/0155848 A1* | 10/2002 | Suryanarayana ............ 455/466 |
| 2002/0161587 A1* | 10/2002 | Pitts et al. ................... 704/276 |
| 2002/0193094 A1* | 12/2002 | Lawless et al. ............. 455/407 |
| 2003/0060188 A1* | 3/2003 | Gidron et al. .............. 455/408 |
| 2003/0065802 A1* | 4/2003 | Vitikainen et al. .......... 709/231 |
| 2003/0125023 A1* | 7/2003 | Fishler ....................... 455/426 |
| 2003/0211845 A1* | 11/2003 | Lohtia et al. ............. 455/414.3 |
| 2004/0002324 A1* | 1/2004 | Juntunen et al. ............. 455/406 |
| 2004/0075675 A1* | 4/2004 | Raivisto et al. ............. 345/700 |
| 2004/0098625 A1* | 5/2004 | Lagadec et al. ............ 713/201 |
| 2004/0120323 A1* | 6/2004 | Viikari et al. ............. 370/395.5 |
| 2004/0181550 A1* | 9/2004 | Warsta ...................... 707/104.1 |
| 2004/0209602 A1* | 10/2004 | Joyce et al. ............. 455/414.1 |
| 2005/0027591 A9* | 2/2005 | Gailey et al. ................. 705/14 |
| 2006/0195570 A1* | 8/2006 | Zellner et al. .............. 709/224 |

* cited by examiner

*Primary Examiner*—William Trost
*Assistant Examiner*—James D. Ewart
(74) *Attorney, Agent, or Firm*—Rosenberg, Klein & Lee

(57) ABSTRACT

A method of a multimedia information service and an information inquiry download service. Users access an information inquiry platform with mobile phones, in order to search for and download information. Depending on the type of requested information a content provider obtains or supplies the user's desired information. The information is then transmitted to a common service platform. The common service platform transmits the information to the user's mobile phone via a multimedia service center. If necessary, the user's location can be automatically obtained in order to provide location specific information such as maps, directions, or addresses.

7 Claims, 2 Drawing Sheets

MULTIMEDIA INFORMATION AND INFORMATION INQUIRY DOWNLOAD SERVICE

BACKGROUND OF THE INVENTION

1. Field of the Invention

The present invention relates to multimedia information services. More specifically, the present invention discloses a multimedia information and information inquiry download service allowing users to download information via mobile communication equipment utilizing unstructured supplementary service data (USSD) or wireless application protocol (WAP).

2. Description of the Prior Art

Due to advancements in telecommunication technology, bandwidth has increased, and the convenience of mobile communications has greatly improved. Therefore, the distance between people has shortened. Presently, $3^{rd}$ generation mobile phones have been developed, which provides Internet access and multimedia information services. As mobile phone functions get stronger, the added value of the phone increases. Therefore, people's lives have become more convenient and the quality of their lives has been enriched. Mobile phones have now become an essential tool in our daily life.

In an advanced information society, people inquire about many different types of information. For example, travellers can find maps, weather reports and near-by highways or streets on the Internet before leaving for their destinations. However, it typically takes time to search and download the information, which is not convenient.

Additionally, if someone wants to change their route, they need to use their computer to search and download the new information from the Internet. This cannot achieve the purpose of immediacy that is useful and convenient. For example, it cannot satisfy the need to provide directions to near-by gas stations or restaurants according to the user's current location. Although $3^{rd}$ generation mobile phones already have powerful functions, the additional service provided to users still cannot satisfy their needs. Therefore, a current dilemma today, is how to improve additional services in order to provide greater and more useful services to users.

Therefore, there is a need for a multimedia information and information inquiry download service allowing users to use mobile phones to search and download desired information instantly and conveniently.

SUMMARY OF THE INVENTION

To achieve these and other advantages and in order to overcome the disadvantages of the conventional method in accordance with the purpose of the invention as embodied and broadly described herein, the present invention provides a multimedia information and information inquiry download service allowing users to download information via mobile communication equipment such as mobile phones utilizing unstructured supplementary service data (USSD) or wireless application protocol (WAP).

An object of the present invention is to provide a method of a multimedia information and information inquiry download service. It allows users to instantly download desired information through multimedia information services, using USSD or WAP, in order to improve the mobile phone's added value and satisfy users' needs.

Another object of the present invention is to provide a method of a multimedia information and information inquiry download service which can automatically obtain the location of the mobile phone user, and then provide appropriate desired information according to the user's location.

The method of a multimedia information and information inquiry download service of the present invention is a multimedia information service that allows people to use mobile phones to search for and download information using USSD or WAP, by entering an information service platform and proceeding to check and download information. According to the user's desired information, the information service platform accesses the appropriate information content provider to obtain the information. The information that users can inquire about is stored in the information content provider or content server. The information is then transmitted to a multimedia service center via a common service platform. Finally, the multimedia service center transmits the information to the user. In this way, the user can instantly receive the desired information.

The information content provider or content server can be an internal information provider server which is installed internally or on-site, or an external information server which is installed externally or at a remote location. When the information content provider is located internally, the information inquiry service platform can enter the internal information provider directly to obtain the desired information. However, when the information content provider is located externally, the information inquiry service platform sends the user's inquiry information to the external information content provider. The external content provider obtains the information according to the inquiry, and then sends the desired information to the common service platform.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
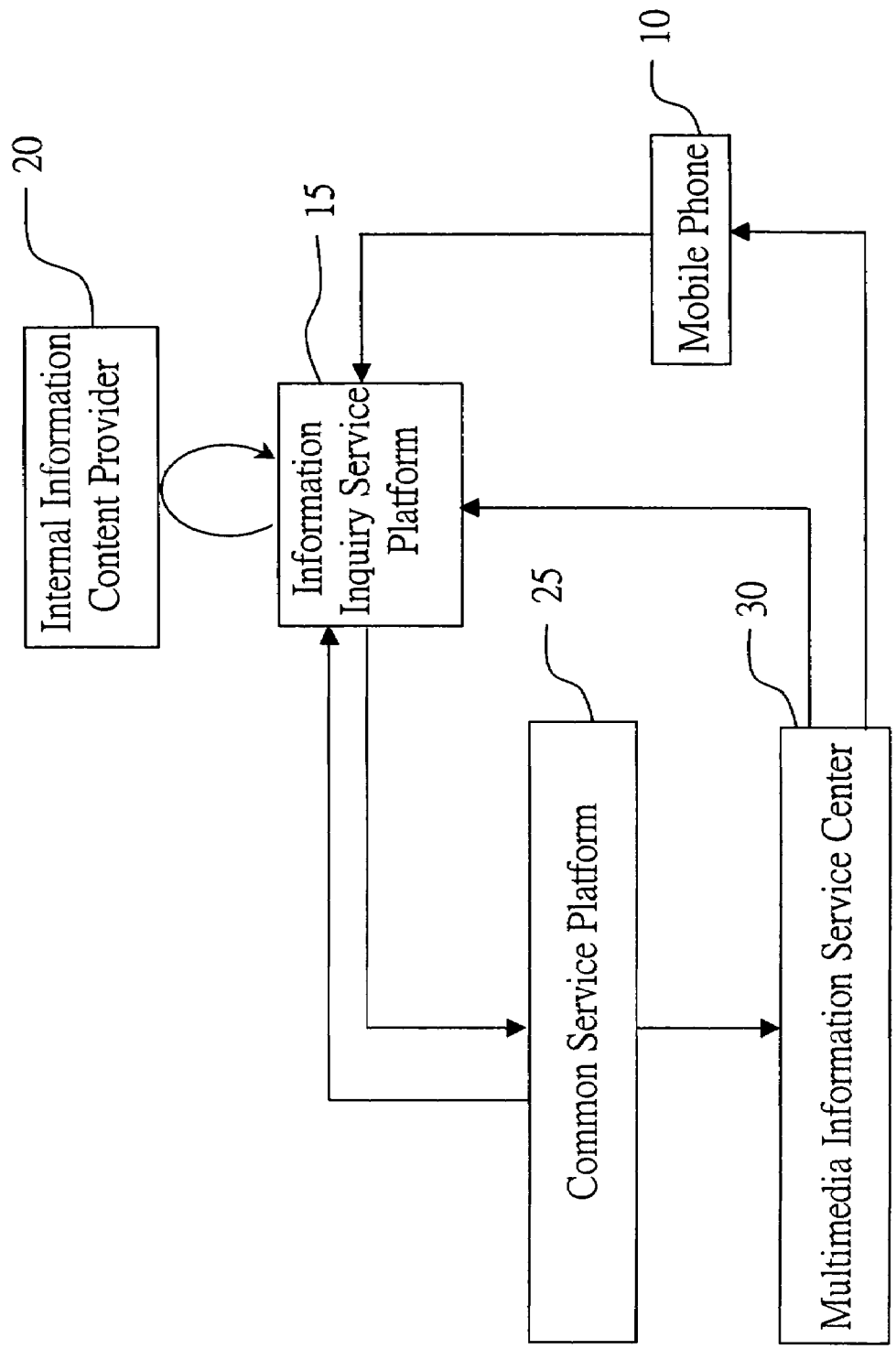
FIG. 1 is a block diagram illustrating a multimedia information and information inquiry download service according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The present invention utilizes USSD or WAP through a mobile phone to provide mobile phone users with a means check and download information directly to the mobile phone, conveniently and instantly. Furthermore, the present invention automatically obtains the exact location of the user and provides the user with more detailed and accurate information according to their needs. In doing so, the multimedia information value of the mobile phone is increased.

Refer to FIG. 1, which is a block diagram illustrating a multimedia information and information inquiry download service according to an embodiment of the present invention.

As shown in FIG. 1, the mobile phone user can use USSD or WAP to enter the information inquiry service platform 15 using a mobile phone 10 in order to proceed with information inquiry and download. According to items selected by the user, the information inquiry service platform 15 accesses an internal information content provider or server 20 to obtain the required information requested by the user. The requested information can be, for example, a weather report or a list of restaurants in a city. The internal information content provider 20 has stored information that can be inquired about or requested by users.

The information inquiry service platform 15 then transmits the obtained information to a common service platform 25. The common service platform 25 transmits the obtained information to a multimedia messaging service center or multimedia information service center 30. Finally, the multimedia information service center 30 sends the information to the user's mobile phone 10. Once the multimedia information service center 30 has finished transmitting the information, it sends another message to the information inquiry service platform 15. When the information inquiry service platform receives the message, it sends a message to the common service platform 25 providing information used regarding payment.

If the information inquired about by the user requires the knowledge of the exact location of the user, then the information inquiry service platform 15 automatically obtains the exact location of the user from the common service platform 25. This type of information requiring location information is for example, if the user requests information regarding the location of near-by restaurants or addresses of businesses.

The common service platform 25 utilizes a base positioning system or a global positioning system, such as GPS, to obtain the location of the mobile phone user. Then according to the location, the information inquiry service platform 15 goes to the content server or internal information provider 20 to gather the information. Finally, the message containing the information is sent to the mobile phone 10 via the common service platform 25 and the multimedia messaging service center 30. The information sent to the mobile phone comprises maps to facilitate the user in locating the desired restaurant, business, or address. In doing so, mobile phone's multimedia information service is increased and improved, allow users to gather the desired information instantly and receive better service.

Figure 2:
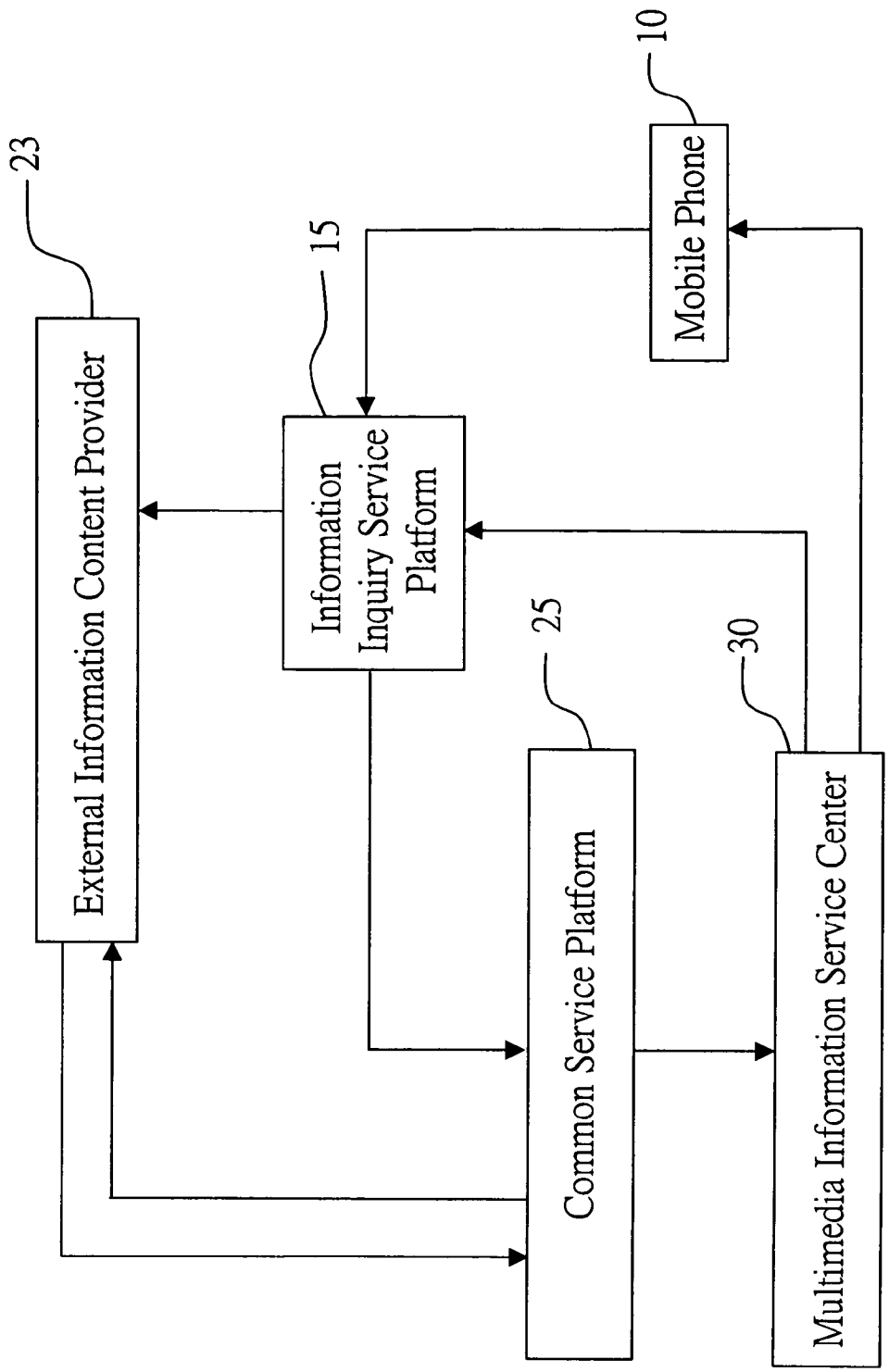
FIG. 2 is a block diagram illustrating a multimedia information and information inquiry download service according to an embodiment of the present invention.

Refer to FIG. 2, which is a block diagram illustrating a multimedia information and information inquiry download service according to an embodiment of the present invention.

As shown in FIG. 2, a user enters the information inquiry service platform 10 via a mobile phone 10. In this embodiment, since the information provider or content server is an external information provider 23, the information inquiry service platform 15 sends a request for the user's desired information to the external information provider 23. According to the received message, the external information provider 23 obtains the desired information, and replies with the information to the common service platform 25. The common service platform 25 then uses the multimedia messaging information service center 30 to send the information to the user's mobile phone 10. After the information is sent by the multimedia information service center 30, it sends a reply to the information inquiry service platform 15. The information inquiry service platform 15 then sends a completion message to the common service platform 15. The completion message contains information regarding the service, service provider, user, etc. to assist in billing or charging for the services rendered.

As illustrated in FIG. 2, when the user's requested or desired information requires the exact location of the user, the external information provider 23 gathers the information regarding the user's location via the common service platform 25. According to the location of the user, the external information provider collects the desired information and sends the desired information to the user's mobile phone 10 through the common service platform 25 and the multimedia information service center 30.

In summary, the method of the multimedia information and information inquiry download service of the present invention, allows users to use mobile phones 10 through USSD or WAP to enter the information inquiry service platform 15 in order to download desired information. In doing so, people can obtain the desired information using only a mobile phone 10. At the same time, the present invention can also obtain the user's location in order to provide more detailed or accurate information. This location dependent information comprises, for example, maps directions, addresses, business locations, etc. Additionally, the present invention can store the requested information or content in an internal information server 20 or in an external information server 23, in order to increase the flexibility of information storage.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A multimedia information and information inquiry download service comprising:

a user uses a mobile phone to access an information inquiry service platform to search for and download information;

according to the information requested, the information inquiry service platform contacts a content provider to obtain the information requested by the user, the content provider providing the information to the information inquiry service platform;

the information inquiry service platform sends the information via a common service platform to a multimedia information service center;

the multimedia information service center sends the information to the mobile phone of the user, responsive to completion of sending the information to the mobile phone the multimedia information service center sends a message to the information inquiry service platform; and the information inquiry service platform transmit data for billing to the common service platform responsive to the message from the multimedia information service center.

2. The multimedia information and information inquiry download service of claim 1, whereby the information inquiry service platform is accessed via unstructured supplementary service data (USSD).

3. The multimedia information and information inquiry download service of claim 1, whereby the information inquiry service platform is accessed via wireless application protocol (WAP).

4. The multimedia information and information inquiry download service of claim 1, whereby according to the requested information, the information inquiry service platform obtains location information of the user via the common service platform and then contacts the content provider to obtain location specific information according to the location information of the user.

5. A multimedia information and information inquiry download service comprising:
- a user accesses an information inquiry service platform with a mobile phone to search for and download information;
- the information inquiry service platform sends a request for the information to a content provider, where the information to be downloaded is dependent on a location of the mobile phone the information inquiry service platform obtains location information of the mobile phone via a common service platform and then contacts the content provider to obtain location specific information according to the location information of the user;
- the content provider obtains the requested information and sends the information to the common service platform;
- the common service platform sends the received information to a
- multimedia information service center;
- the multimedia information service center sends the information to the user's mobile phone, responsive to completion of sending the information to the mobile phone the multimedia information service center sends a message to the information inquiry service platform; and
- the information inquiry service platform transmit data for billing to the common service platform responsive to the message from the multimedia information service center.

6. The multimedia information and information inquiry download service of claim 5, whereby the information inquiry service platform is accessed via unstructured supplementary service data (USSD).

7. The multimedia information and information inquiry download service of claim 5, whereby, the information inquiry service platform is accessed via wireless application protocol (WAP).

* * * * *